(12) United States Patent
Mateo Ferrús et al.

(10) Patent No.: US 9,484,694 B2
(45) Date of Patent: Nov. 1, 2016

(54) TELECOMMUNICATIONS CASSETTE

(71) Applicant: Tyco Electronics AMP Espana SAU, Barcelona (ES)

(72) Inventors: Rafael Mateo Ferrús, Barcelona (ES); Jose Jaime Sanabra Jansa, Barcelona (ES)

(73) Assignee: CommScope Connectivity Spain, S.L., Madrid ( * ) Notice: Subject to any disclaimer, the term of this patent is extended or adjusted under 35 U.S.C. 154(b) by 135 days.

(21) Appl. No.: 13/912,825

(22) Filed: Jun. 7, 2013

(65) Prior Publication Data
US 2013/0344733 A1    Dec. 26, 2013

Related U.S. Application Data

(60) Provisional application No. 61/663,950, filed on Jun. 25, 2012.

(51) Int. Cl.
| | |
|---|---|
| *H01R 13/518* | (2006.01) |
| *H01R 31/06* | (2006.01) |
| *H01R 13/66* | (2006.01) |
| *H04Q 1/02* | (2006.01) |

(52) U.S. Cl.
CPC ............ *H01R 31/06* (2013.01); *H01R 13/518* (2013.01); *H01R 13/6658* (2013.01); *H04Q 1/13* (2013.01)

(58) Field of Classification Search
CPC   H01R 13/518; H01R 13/6658; H01R 31/06; H01R 12/51; H01R 23/68; H01R 23/70; H01R 13/6469; H01R 13/6466; H04Q 1/13
USPC ..................... 439/540.1, 76.1, 638
See application file for complete search history.

(56) References Cited

U.S. PATENT DOCUMENTS

| | | | |
|---|---|---|---|
| 6,413,120 B1 * | 7/2002 | Winings et al. ........... | 439/540.1 |
| 6,582,255 B2 | 6/2003 | Simmons et al. | |
| 7,316,586 B2 * | 1/2008 | Anderson et al. ........... | 439/638 |
| 7,591,687 B2 * | 9/2009 | Caveney .................... | 439/540.1 |
| 7,628,644 B1 | 12/2009 | Peluffo et al. | |

(Continued)

FOREIGN PATENT DOCUMENTS

EP      2 034 565 A2    3/2009

OTHER PUBLICATIONS

International Search Report and Written Opinion for PCT/EP2013/063309 mailed Aug. 27, 2013.
Data Center Products, Tyco Electronics catalog, 2010, pp. 1-16.
MRJ21 System catalog, 2012, www.ampnetconnect.eu, pp. 1-6.

*Primary Examiner* — Felix O Figueroa
(74) *Attorney, Agent, or Firm* — Merchant & Gould

(57) ABSTRACT

A telecommunications cassette (14, 114) that includes a body (30) with a front (32) and an opposite rear (34), two rows (38) of RJ45 jacks (20) disposed on the front (32), and two MRJ21 connectors (36) disposed on the rear (34). The two rows (38) of RJ45 jacks (20) are oriented opposite to one another, and the two rows of RJ45 jacks are offset from one another. The MRJ21 connectors (36) are oriented in the same direction, and the MR21 connectors (36) are vertically offset from one another. Two circuit boards (52, 56) are provided within the body (30), wherein one row (38, 39, 40) of RJ45 jacks (20) is connected to a respective one of the MRJ21 connectors (36), and wherein one of the circuit boards (50, 52, 56) includes a notch (66) for receiving one of the MRJ21 connectors (36, 37, 41).

9 Claims, 24 Drawing Sheets

(56) References Cited

U.S. PATENT DOCUMENTS

| | | | |
|---|---|---|---|
| 7,901,236 B2 * | 3/2011 | Patchett | H01R 13/518 439/354 |
| 7,901,238 B1 | 3/2011 | Muir et al. | |
| 7,914,324 B2 * | 3/2011 | Pepe et al. | 439/540.1 |
| 2011/0103750 A1 | 5/2011 | Claessens et al. | |

* cited by examiner

TELECOMMUNICATIONS CASSETTE

CROSS-REFERENCE TO RELATED APPLICATION

The present patent application claims the benefit of U.S. Provisional Patent Application Ser. No. 61/663,950, filed Jun. 25, 2012, which application is hereby incorporated by reference in its entirety.

BACKGROUND OF THE INVENTION

Telecommunications equipment is known for connecting telecommunications cables to each other and to other equipment. In the case of twisted pair copper telecommunications cables, various connector formats are known, including RJ45, and MRJ21. An RJ45 connector usually terminates a four-pair copper cable. An MRJ21 connector usually terminates a 24-pair copper cable.

Cassettes are sometimes used to group connectors together for cable management or for other reasons. The cassettes are mountable in telecommunications equipment such as patch panels. Sometimes the cassettes snap into place. Various concerns exist in data centers and other telecommunications equipment rooms or areas including space constraints, ease of use, and cost. There is a need for continued improvement in patch panel design, cassette design, and cable connectivity.

SUMMARY OF THE INVENTION

One aspect of the present invention relates to a telecommunications cassette including a body construction having a front and an opposite rear. The front includes RJ45 jacks. The rear includes MRJ21 connectors. The cassette is used to connect RJ45 four pair patch cables to MRJ21 multi-pair cables. In one embodiment, two rows of four RJ45 jacks are provided on the front surface, and two MRJ21 connectors are provided on the rear surface. Two circuit boards are provided in the interior of the cassette. One circuit board connects four of the RJ45 jacks to one of the MRJ21 connectors, and a second circuit board is provided connecting a second four of the RJ45 jacks to the second MRJ21 connector. In one embodiment, an upper row of RJ45 jacks is connected to one MRJ21 connector, and a lower row of RJ45 jacks is connected to the second MRJ21 connector. The MRJ21 connectors have the same orientation, whereas the RJ45 jacks have a flipped orientation between the top row and the bottom row. In one implementation, the top row of RJ45 jacks is offset or shifted from the bottom row of RJ45 jacks.

In one implementation, one of the MRJ21 connectors is positioned in a notched region of the circuit board connected to the other MRJ21 connector.

In one implementation, both of the MRJ21 connectors are mounted on the same facing side of the respective circuit board, and the two rows of RJ45 jacks are mounted on outward facing sides of the circuit boards.

In one implementation, circuit tracing and management is included with the cassette.

DETAILED DESCRIPTION OF THE PREFERRED EMBODIMENTS

Figure 1:
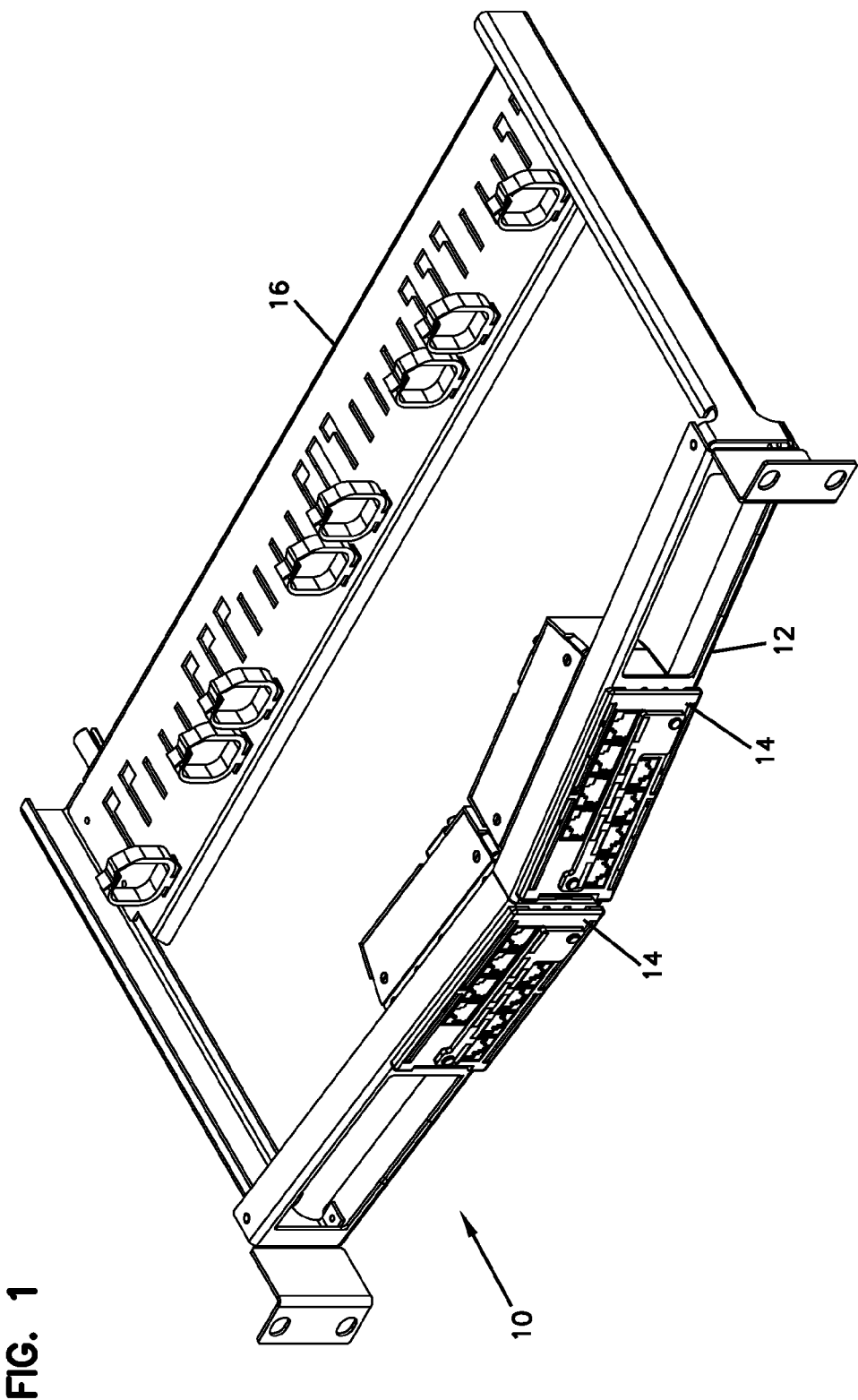
FIG. 1 is a top, front perspective view of a patch panel including two telecommunications cassettes in accordance with the present invention.
Figure 2:
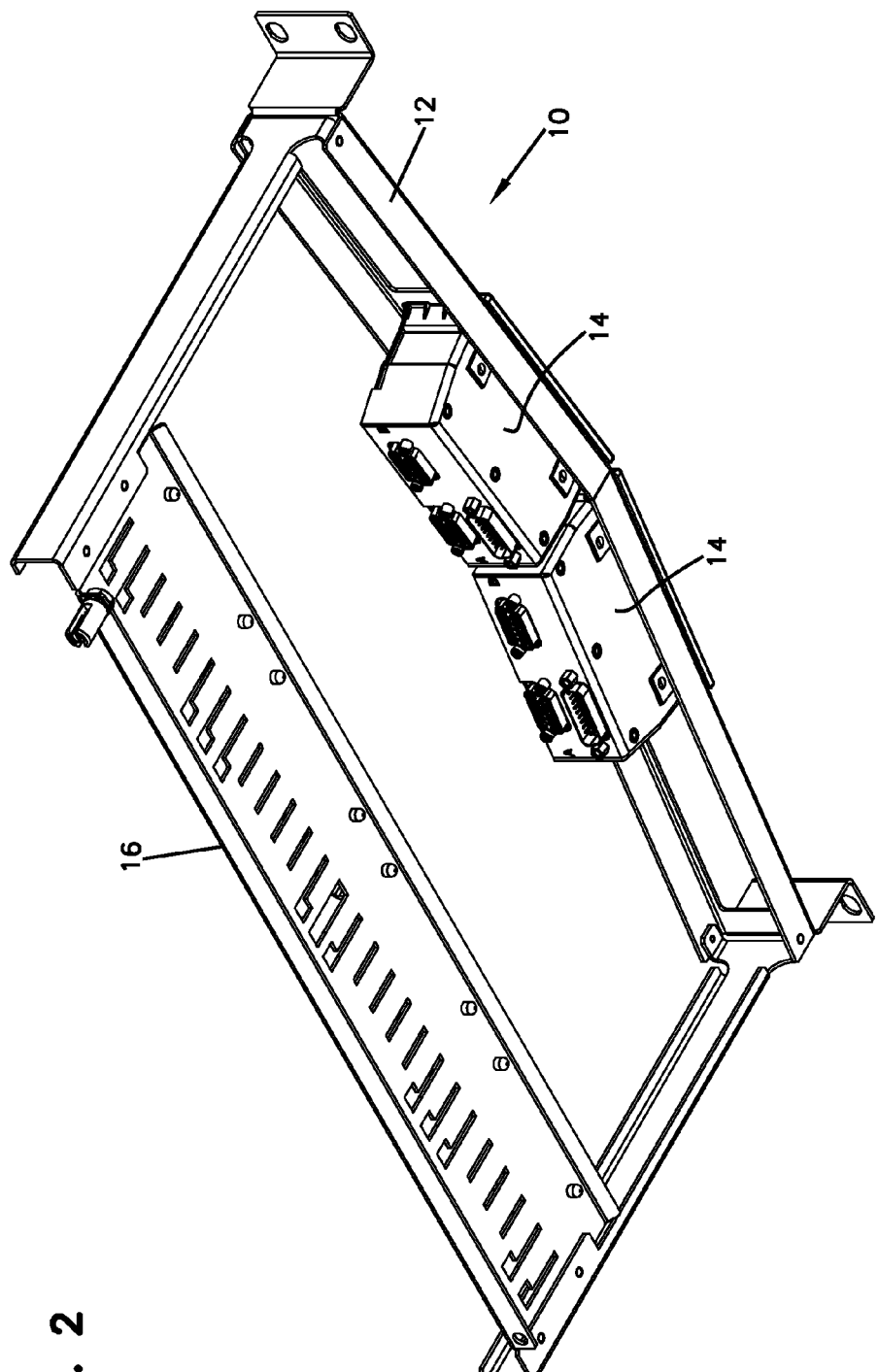
FIG. 2 is a bottom, rear perspective view of the patch panel of FIG. 1.
Figure 3:
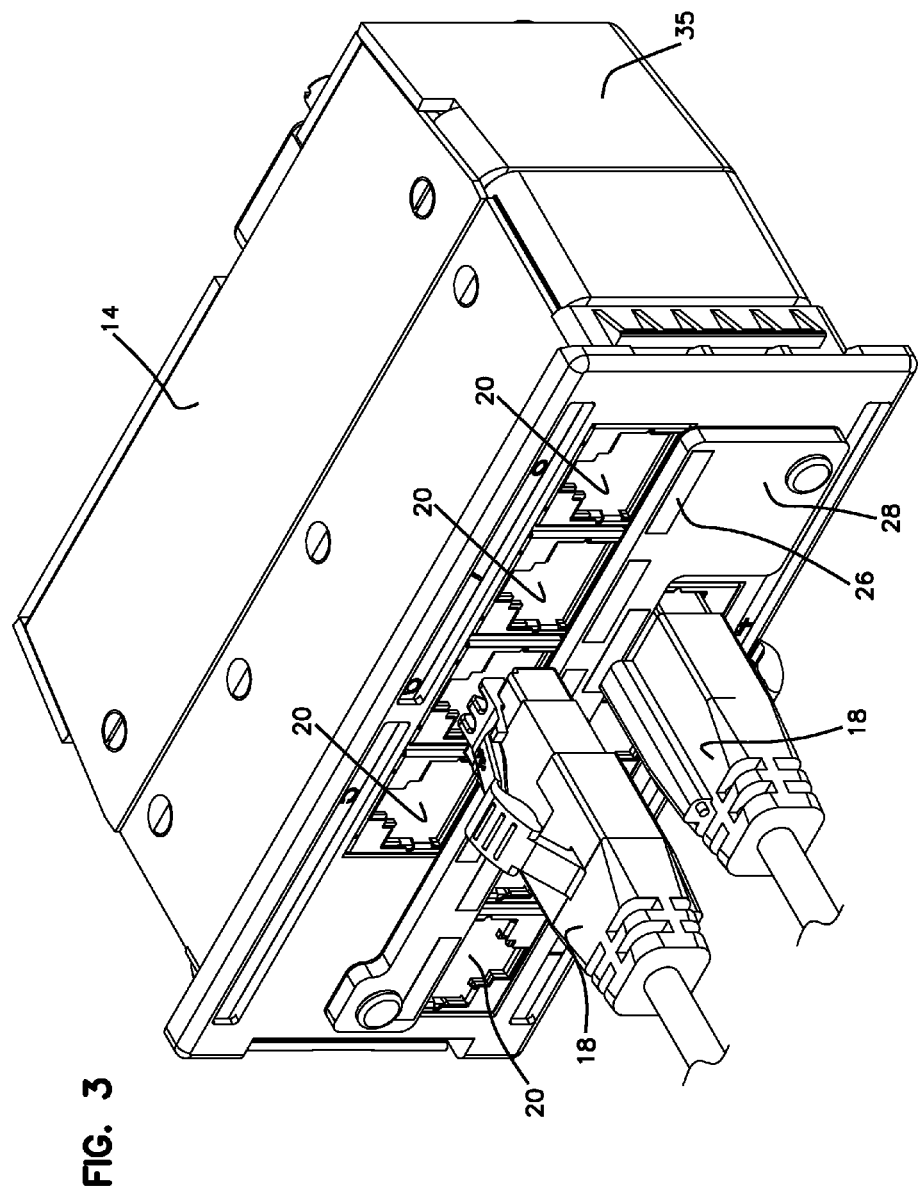
FIG. 3 is a top, front perspective view of one of the telecommunications cassettes including two mated RJ45 plugs for a cable tracing and management system.
Figure 4:
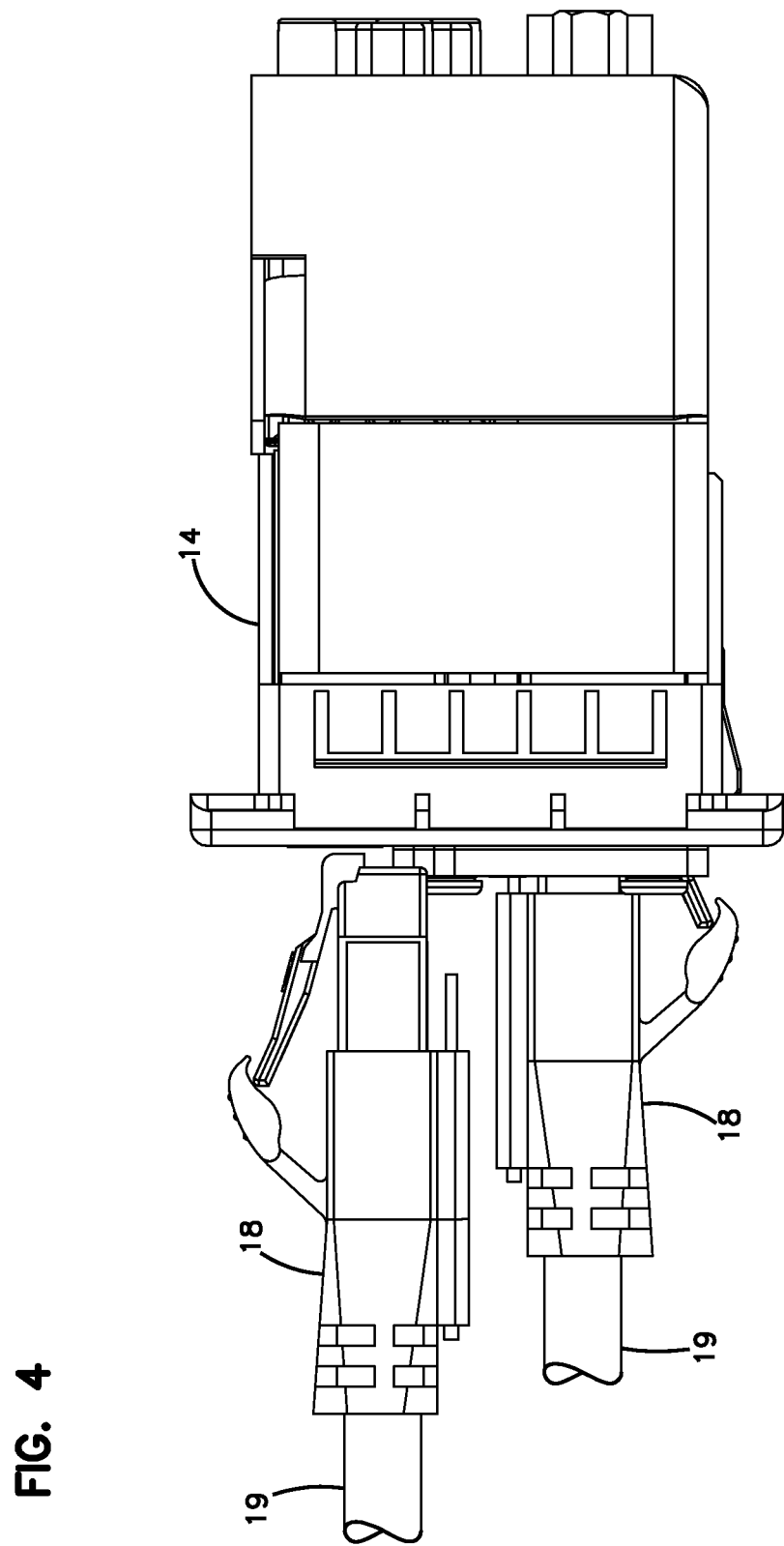
FIG. 4 is a side view of the cassette of FIG. 3.
Figure 5:
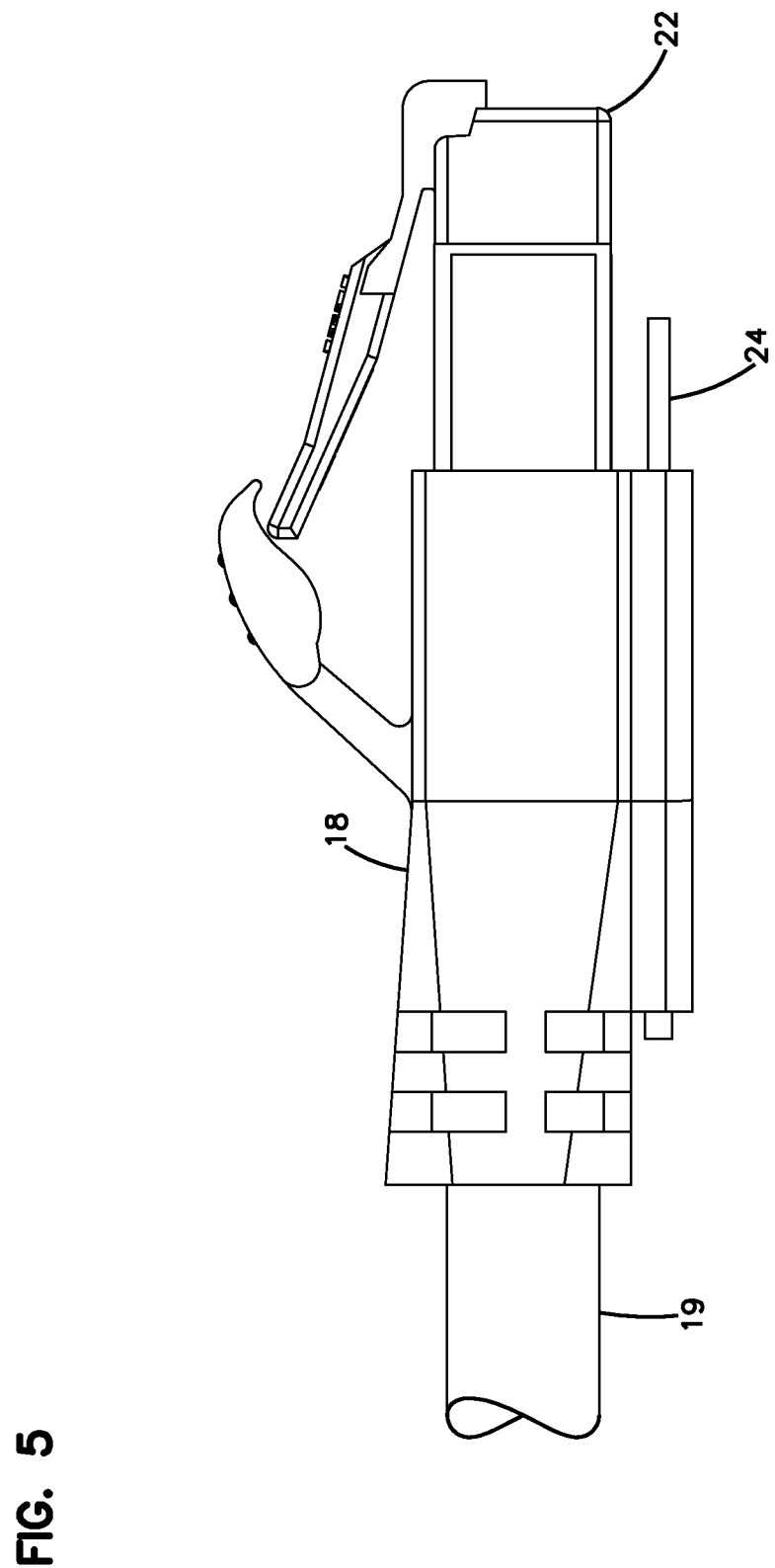
FIG. 5 is a side view of one of the RJ45 plugs of FIG. 3.
Figure 6:
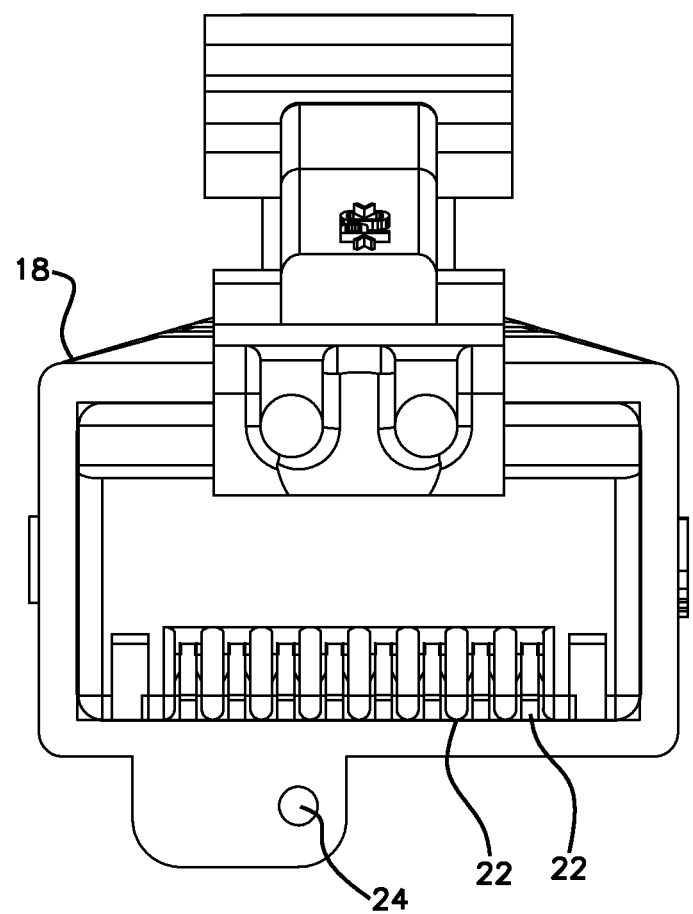
FIG. 6 is a front view of the RJ45 plug of FIG. 5.
Figure 7:
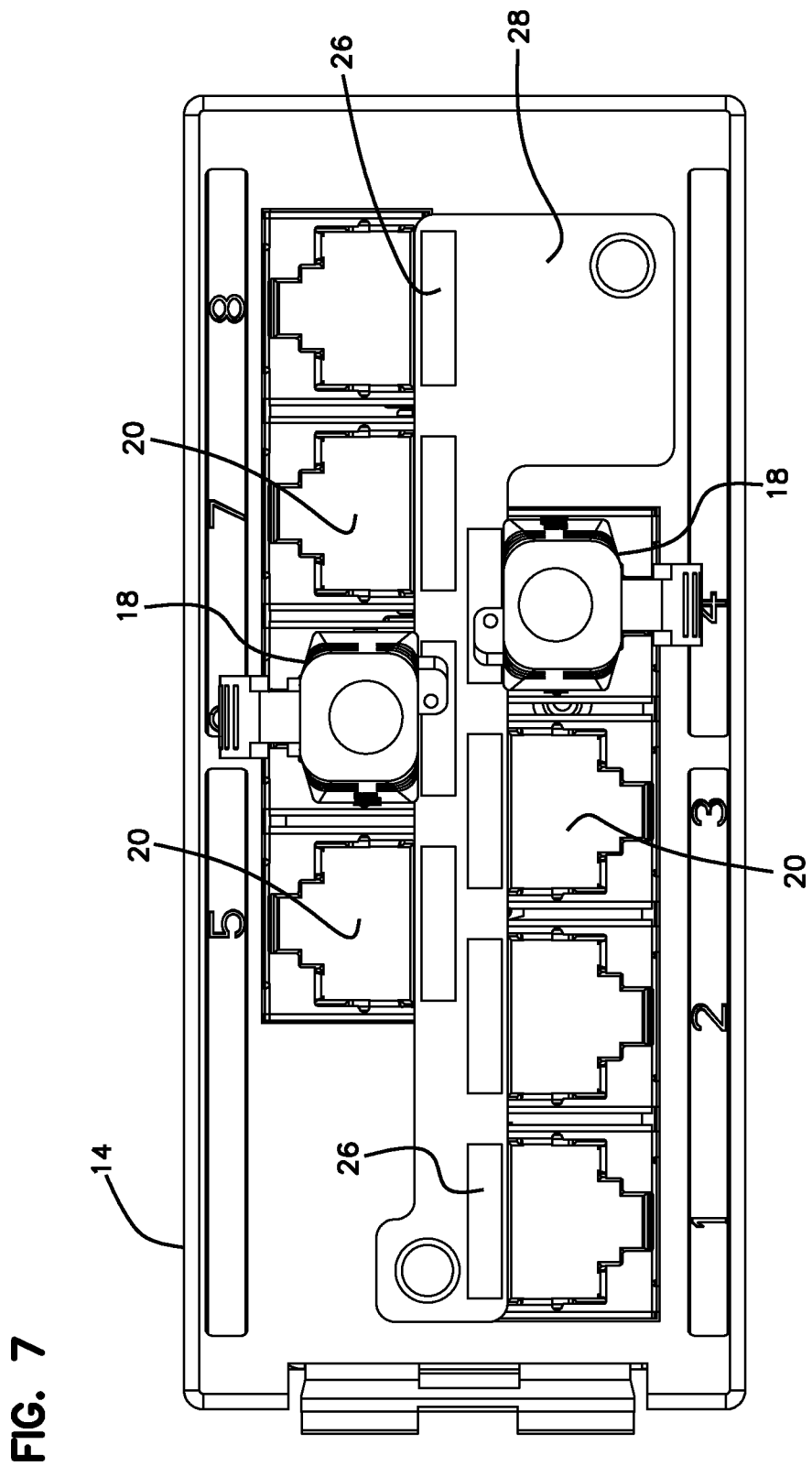
FIG. 7 is a front view of the cassette of FIG. 3.
Figure 8:
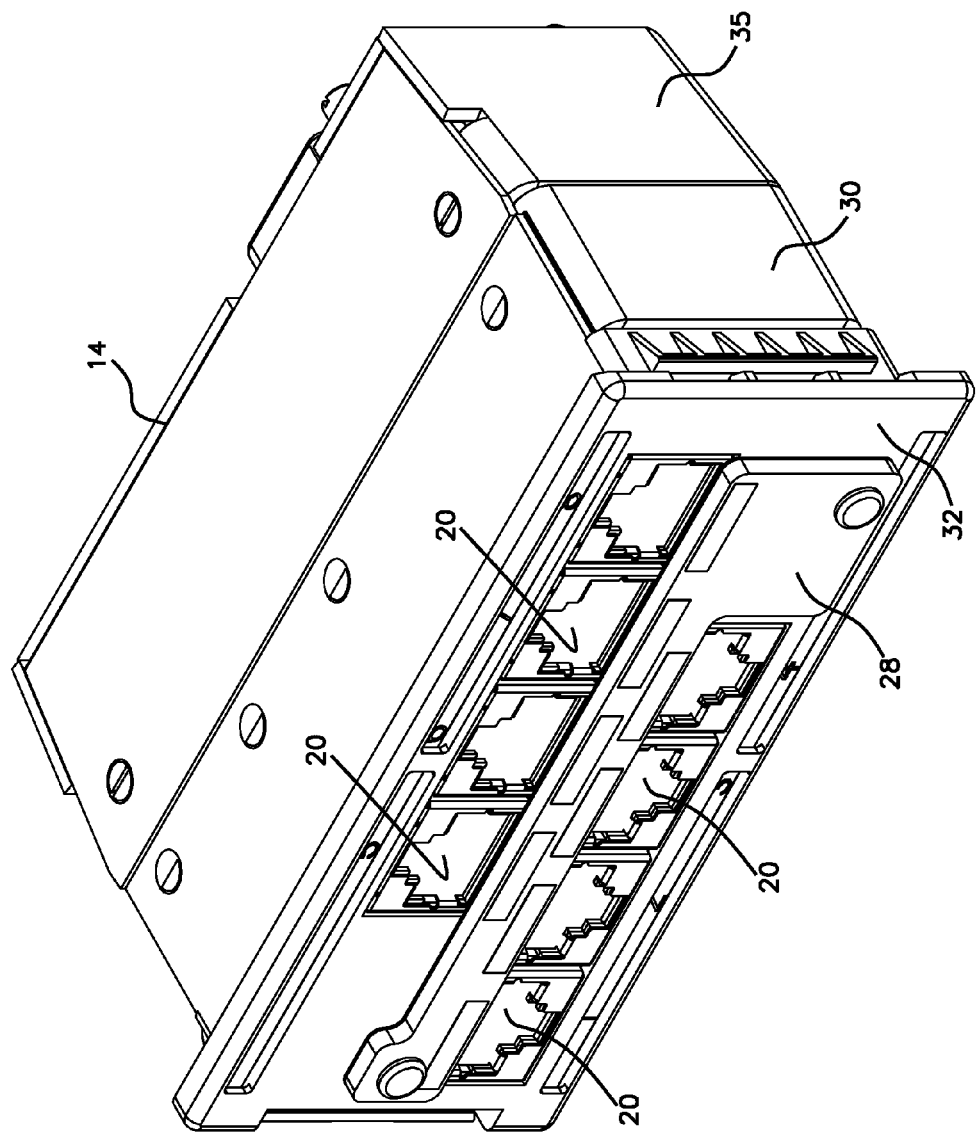
FIG. 8 is a top, front perspective view of the cassette shown in FIG. 3.
Figure 9:
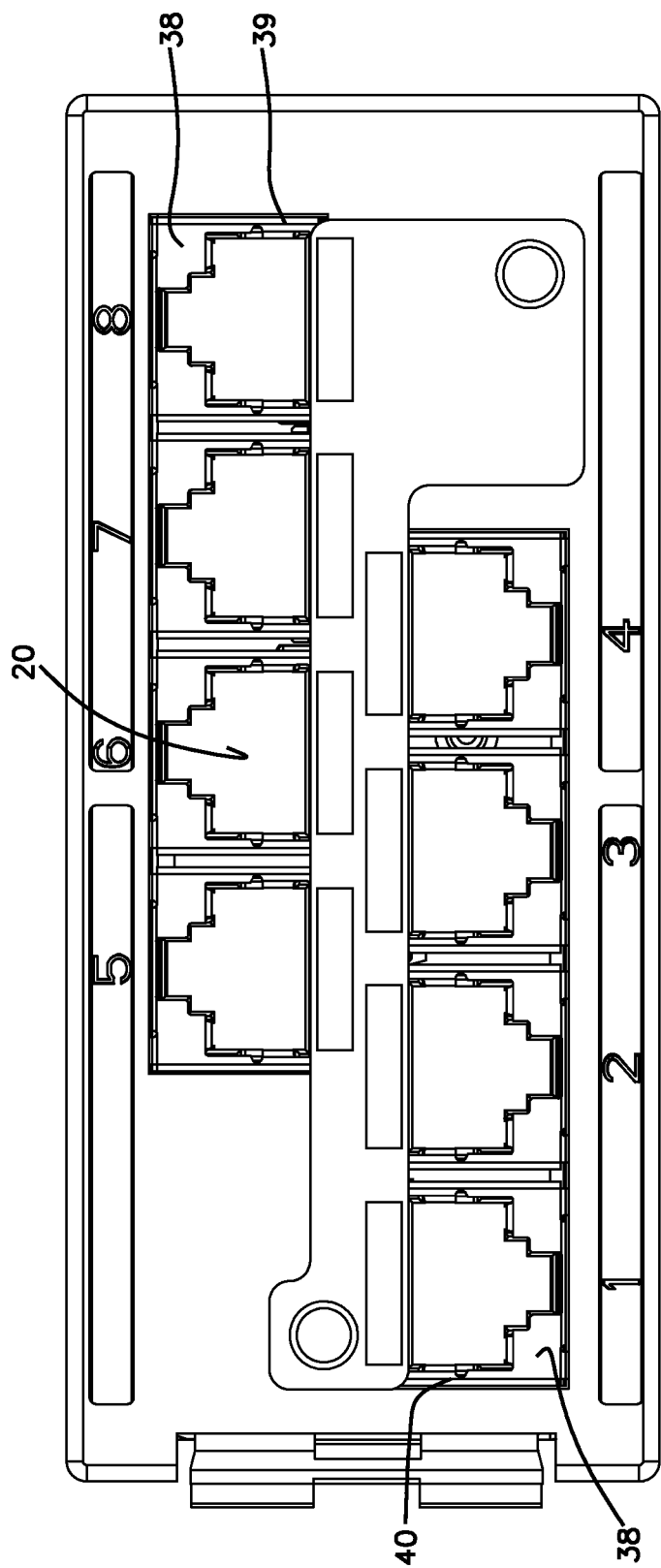
FIG. 9 is a front view of the cassette shown in FIG. 8.
Figure 10:
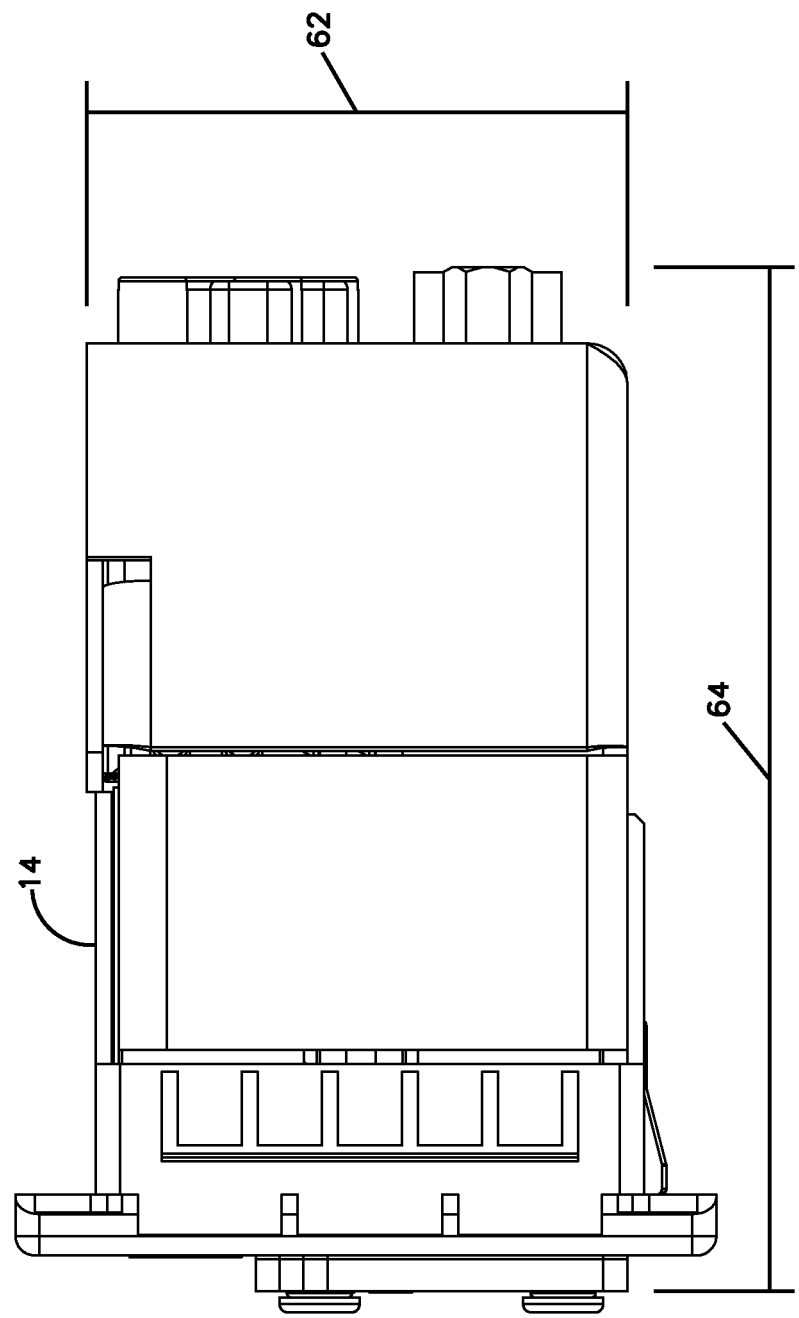
FIG. 10 is a side view of the cassette shown in FIG. 8.

Referring now to FIGS. 1 and 2, a patch panel 10 is shown including a front 12 having two telecommunications cassette 14 mounted to front 12. Four cassettes 14 can be used in patch panel 10. In the implementation shown, panel 10 has an angled front 12. Panel 10 also includes a rear cable manager 16.

Referring now to FIGS. 3 through 7, telecommunications cassette 14 is shown with two connectors or plugs 18 mounted to RJ45 jacks 20. Plugs 18 include main contacts 22, such as eight, and an additional contact 24 for use in patch-cord tracing and management. Additional contact 24 is received by conductive pad 26 of PCB 28 adjacent to each jack 20. Plugs 18 each terminate four pair (twisted pairs) copper cables 19. Plugs 18 electrically connect to contacts in each jack 20.

Figure 11:
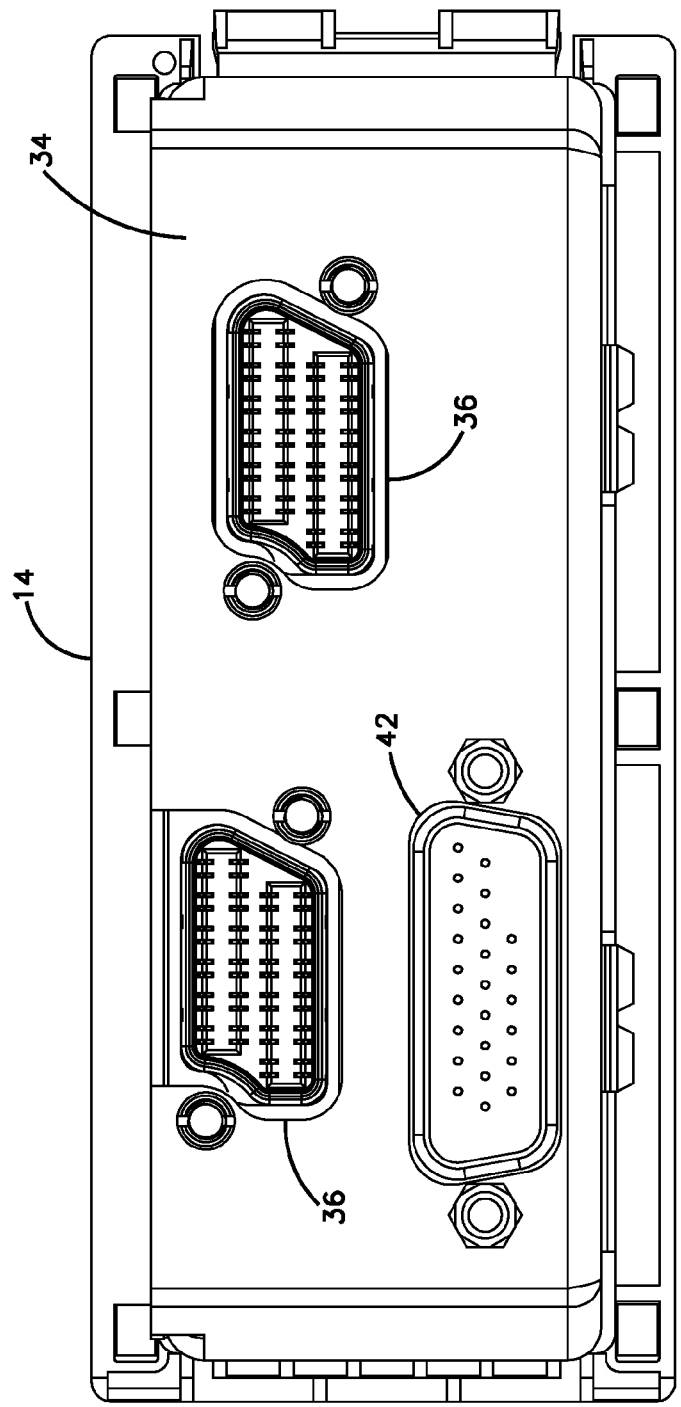
FIG. 11 is a rear view of the cassette shown in FIG. 8.
Figure 12:
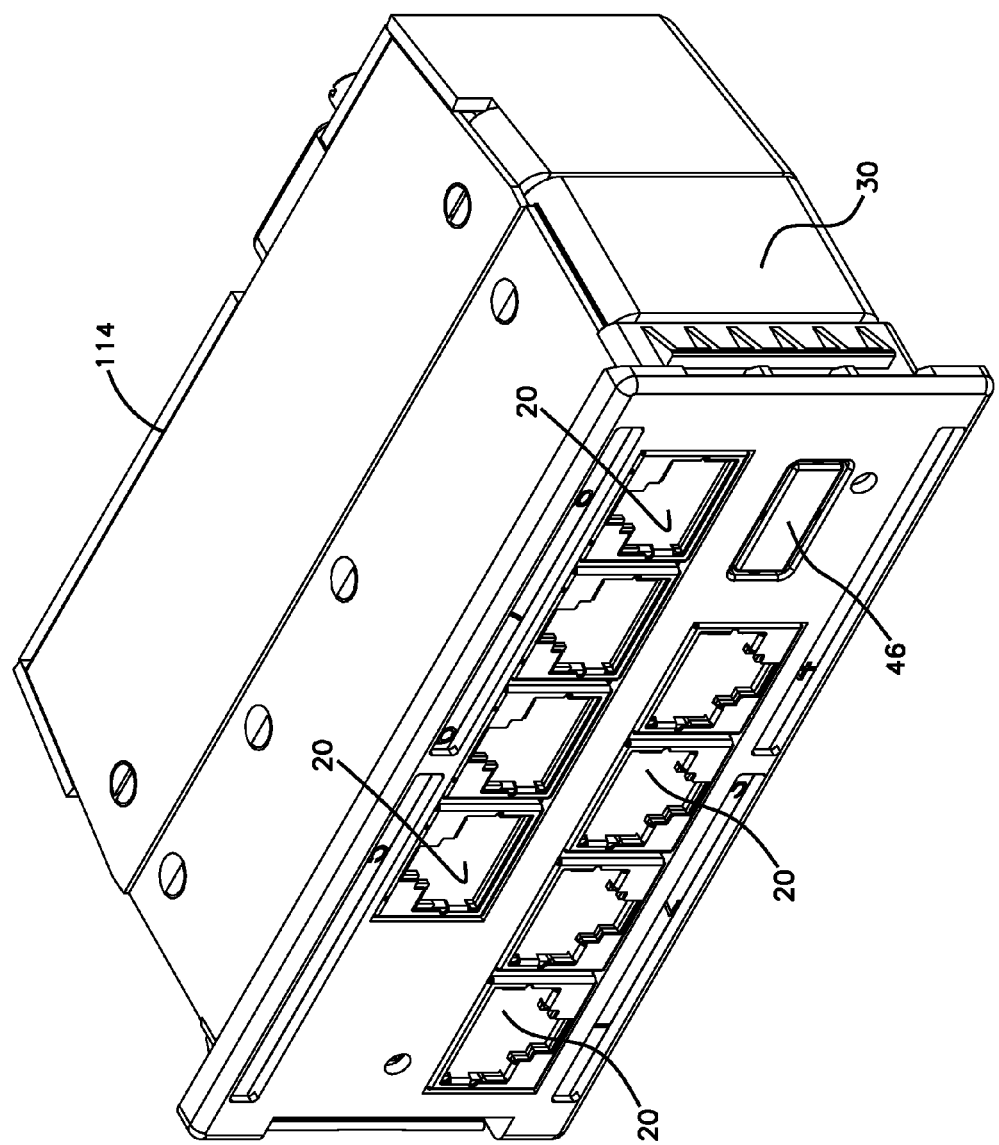
FIG. 12 is a top, front perspective view of an alternative cassette.
Figure 13:
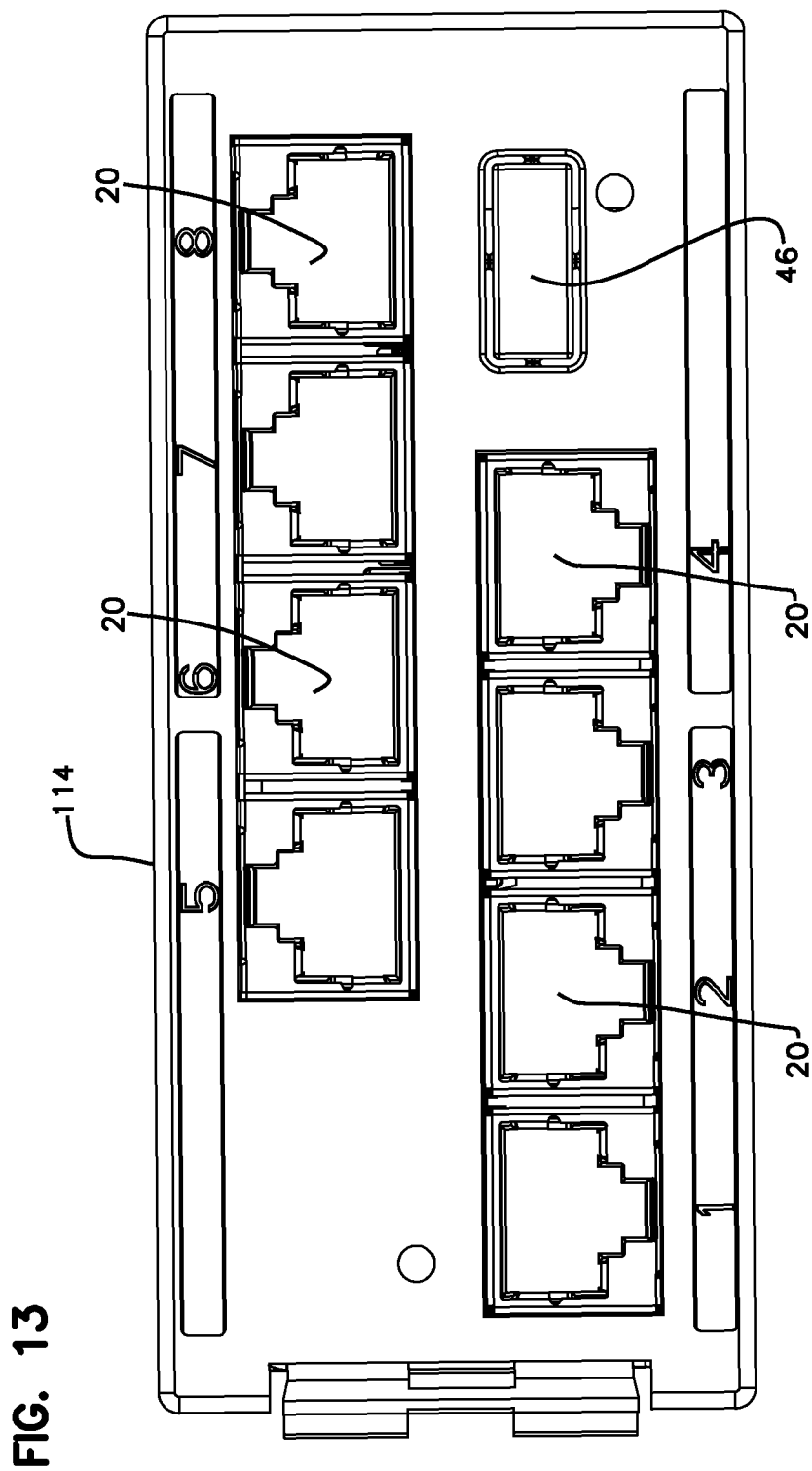
FIG. 13 is a front view of the cassette of FIG. 12.
Figure 14:
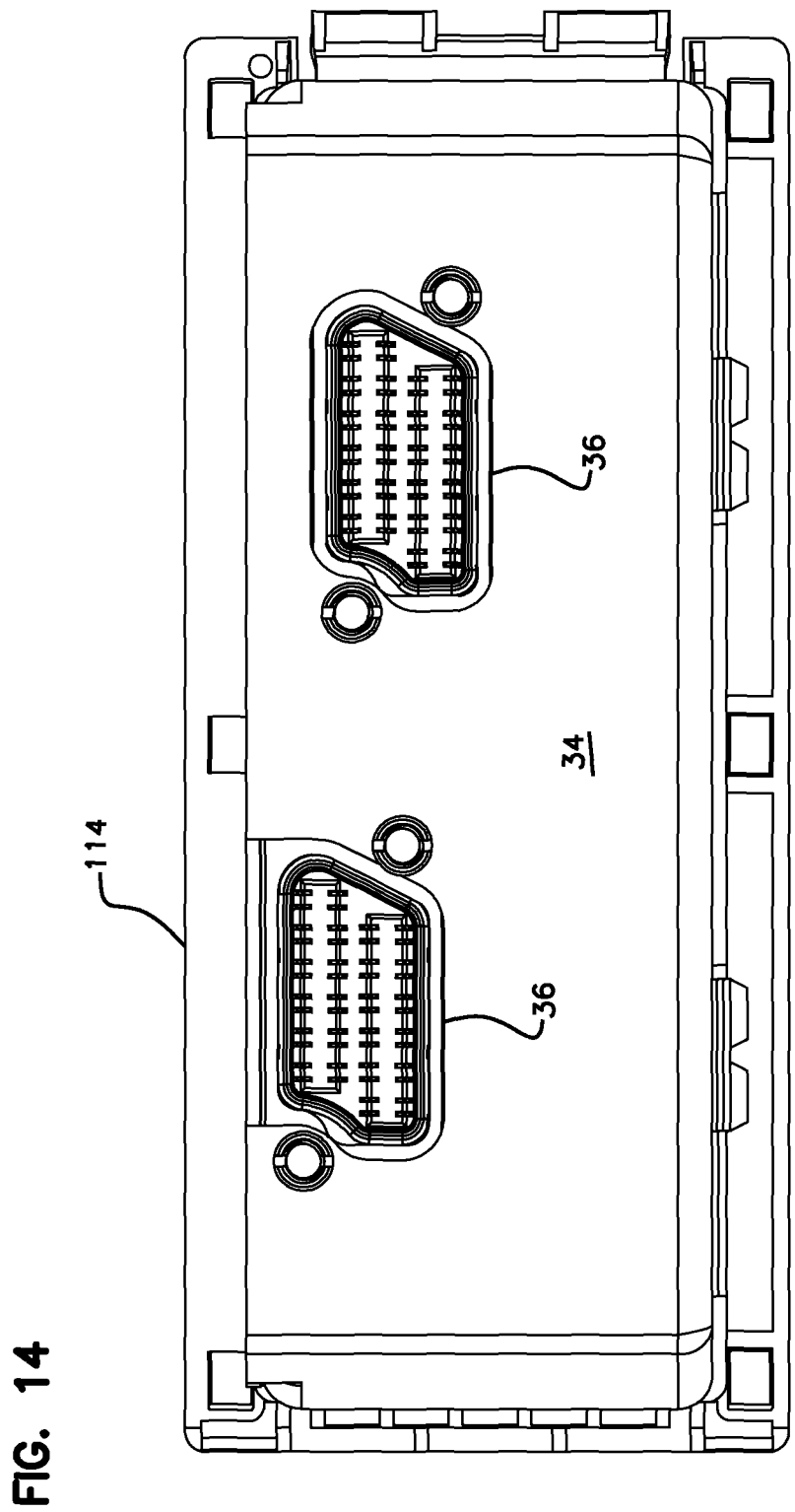
FIG. 14 is a rear view of the cassette of FIG. 13.
Figure 15:
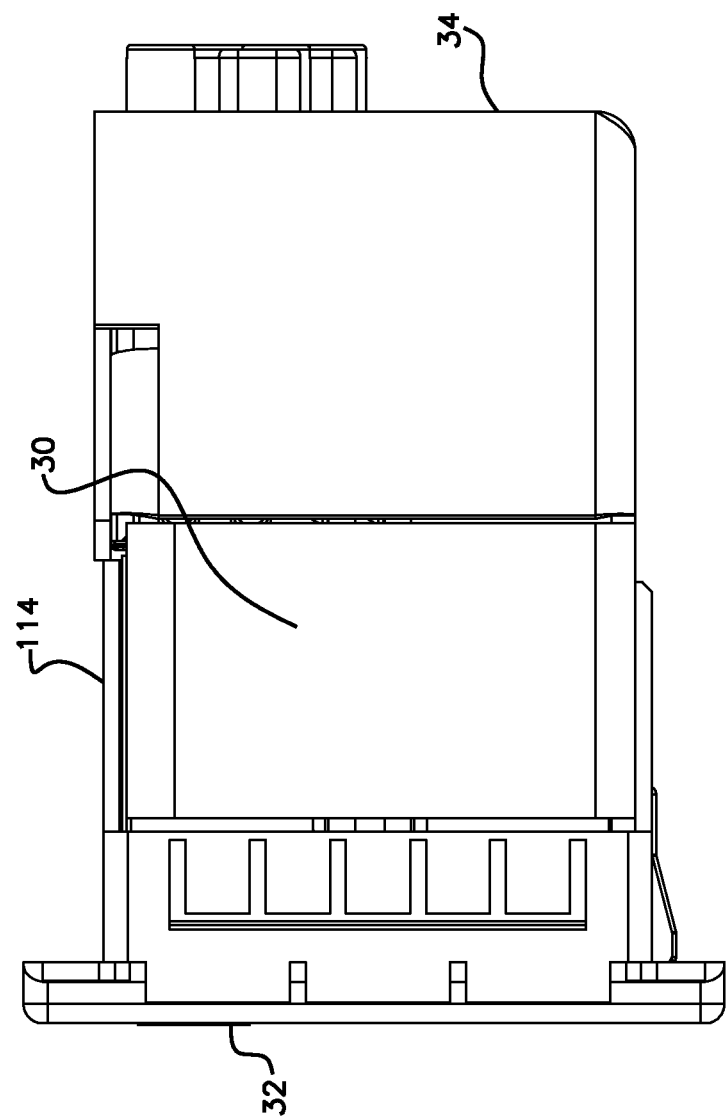
FIG. 15 is a side view of the cassette of FIG. 12.
Figure 16:
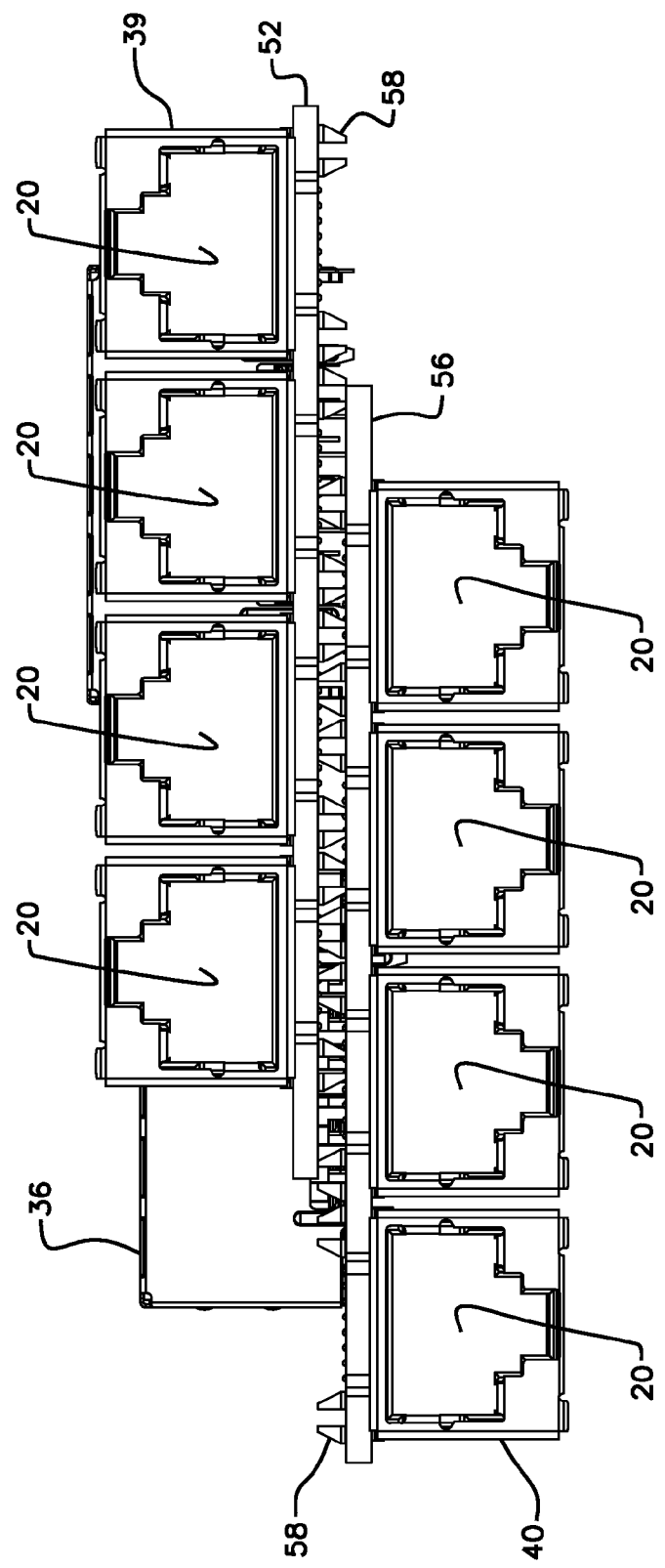
FIG. 16 is a front view of the front RJ45 jacks, and the internal circuitry of the cassettes shown in FIGS. 1-15.
Figure 17:
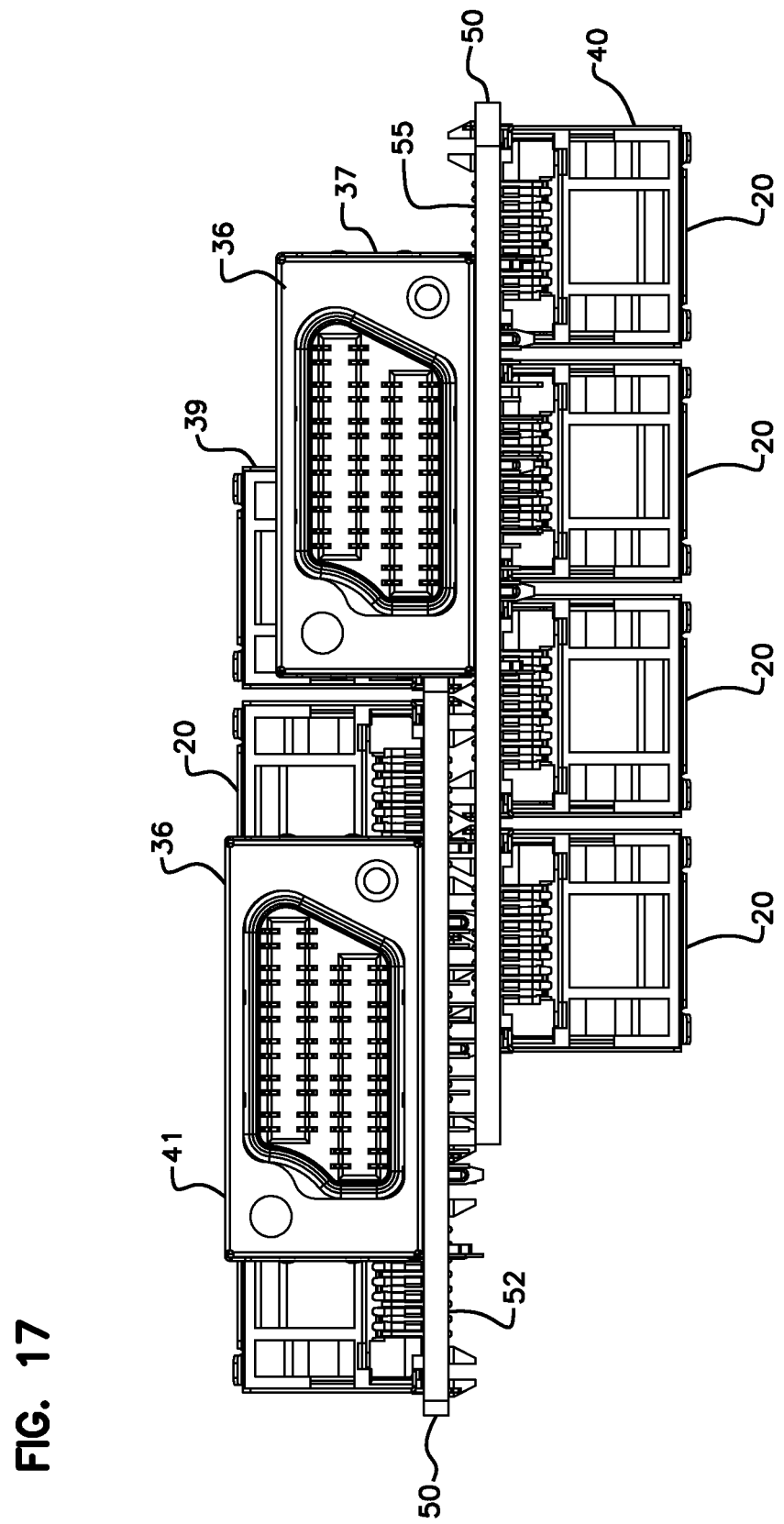
FIG. 17 is a rear view of the components shown in FIG. 16 including the MRJ21 connectors.
Figure 18:
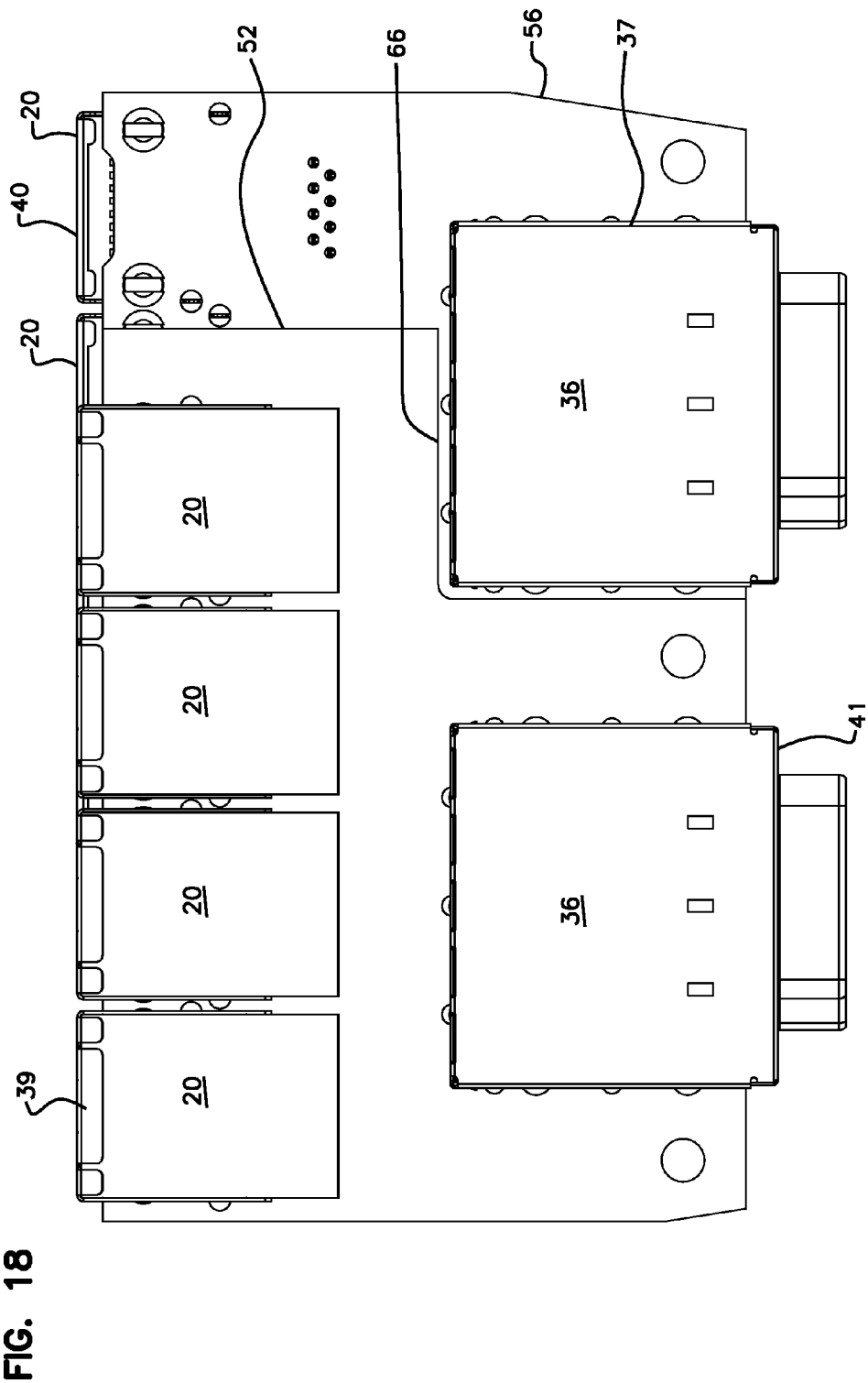
FIG. 18 is a top view of the components shown in FIG. 16.
Figure 19:
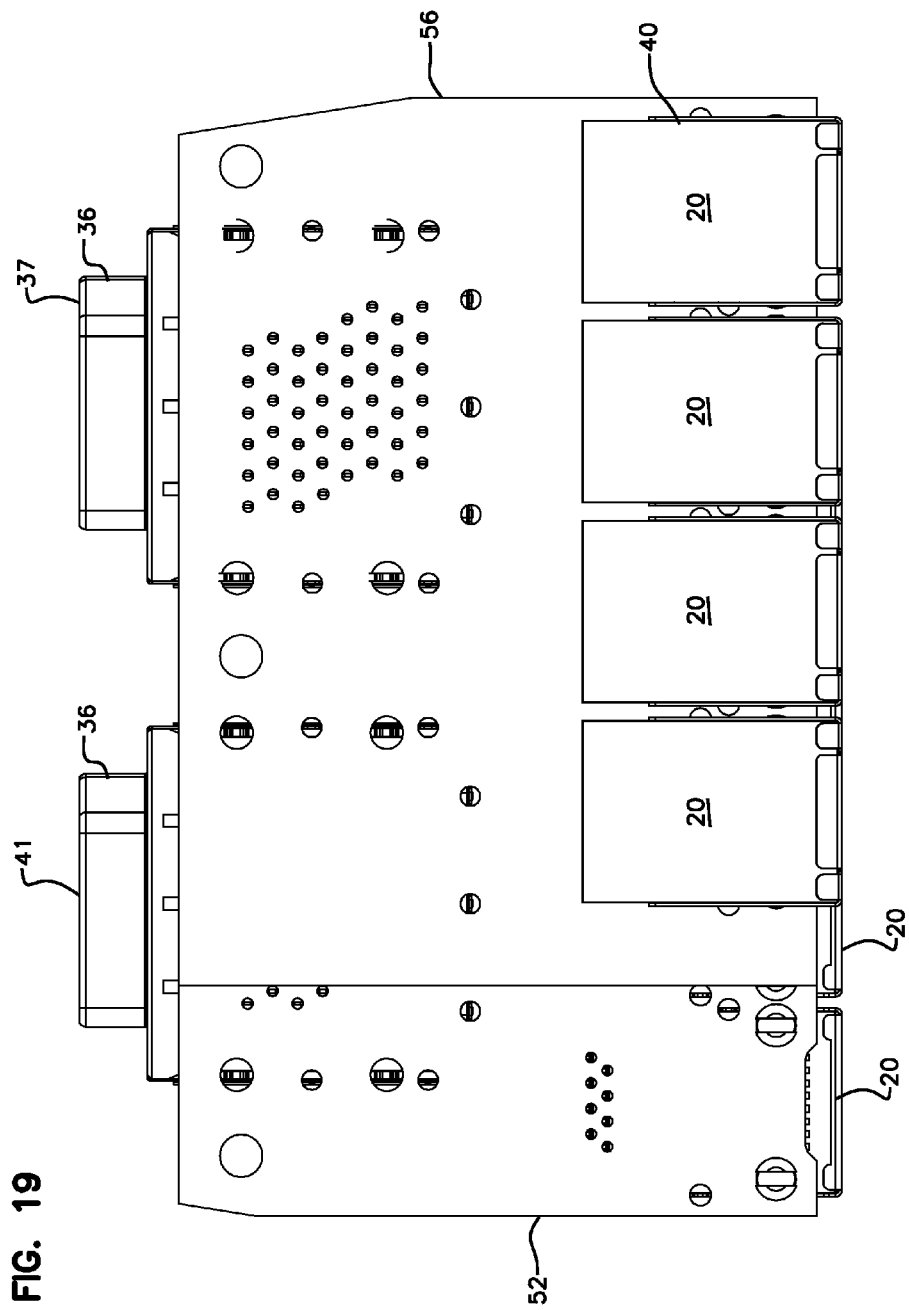
FIG. 19 is a bottom view of the components shown in FIG. 16.
Figure 20:
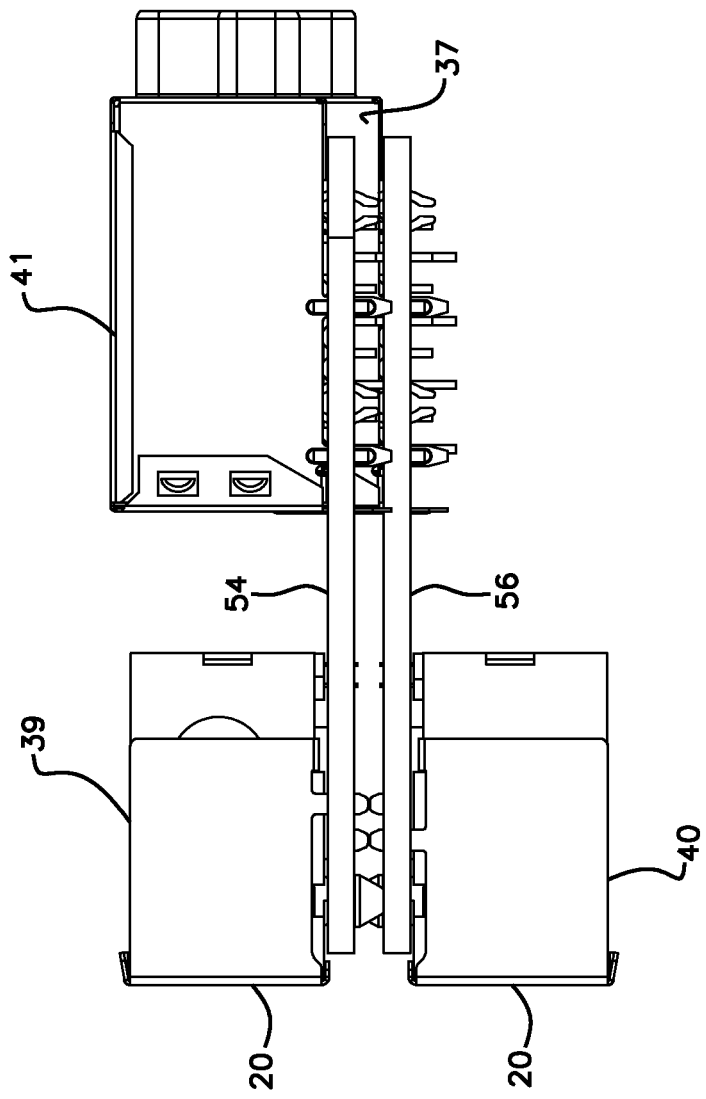
FIG. 20 is a side view of the components shown in FIG. 16.
Figure 21:
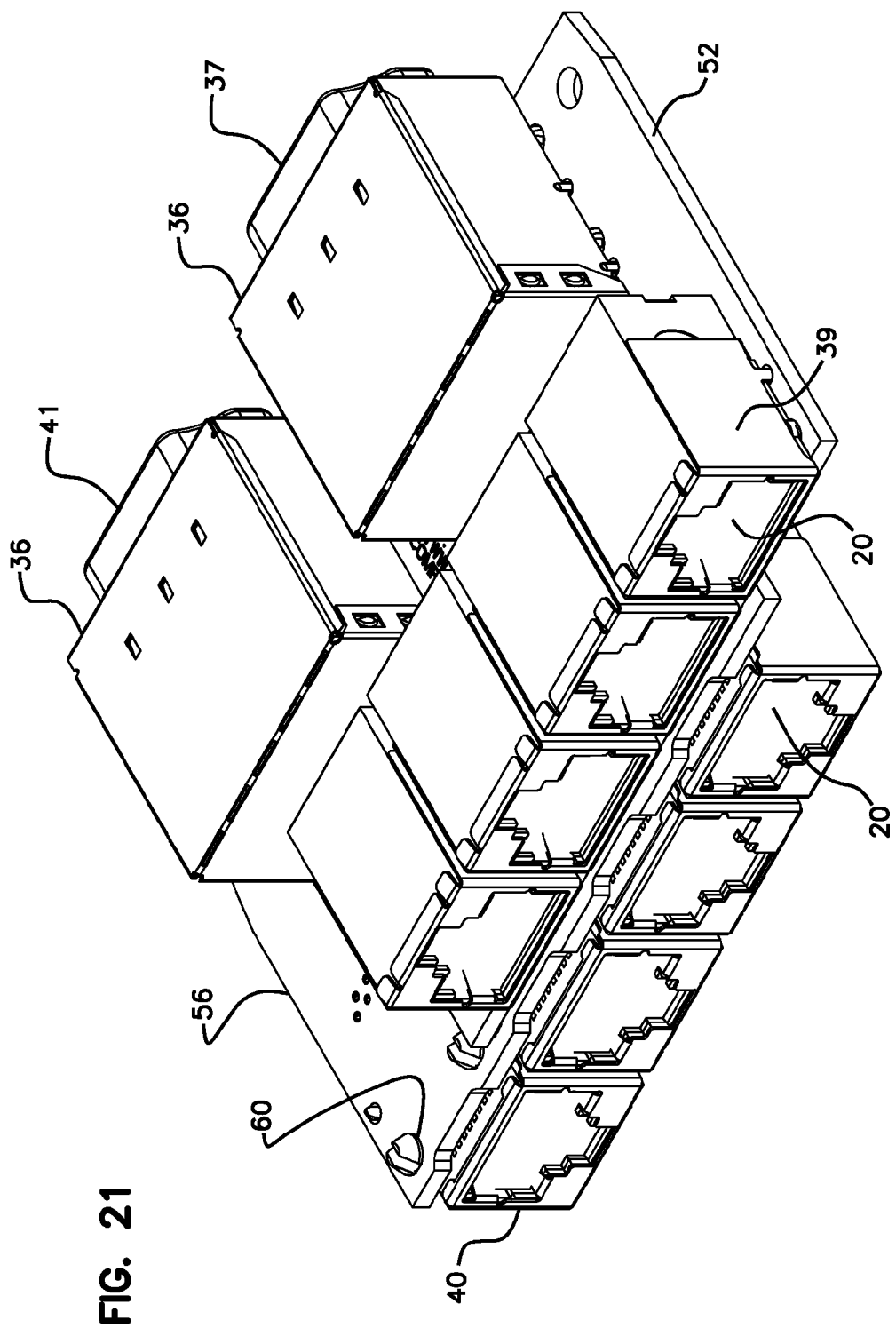
FIG. 21 is a top, front perspective view of the components shown in FIG. 16.
Figure 22:
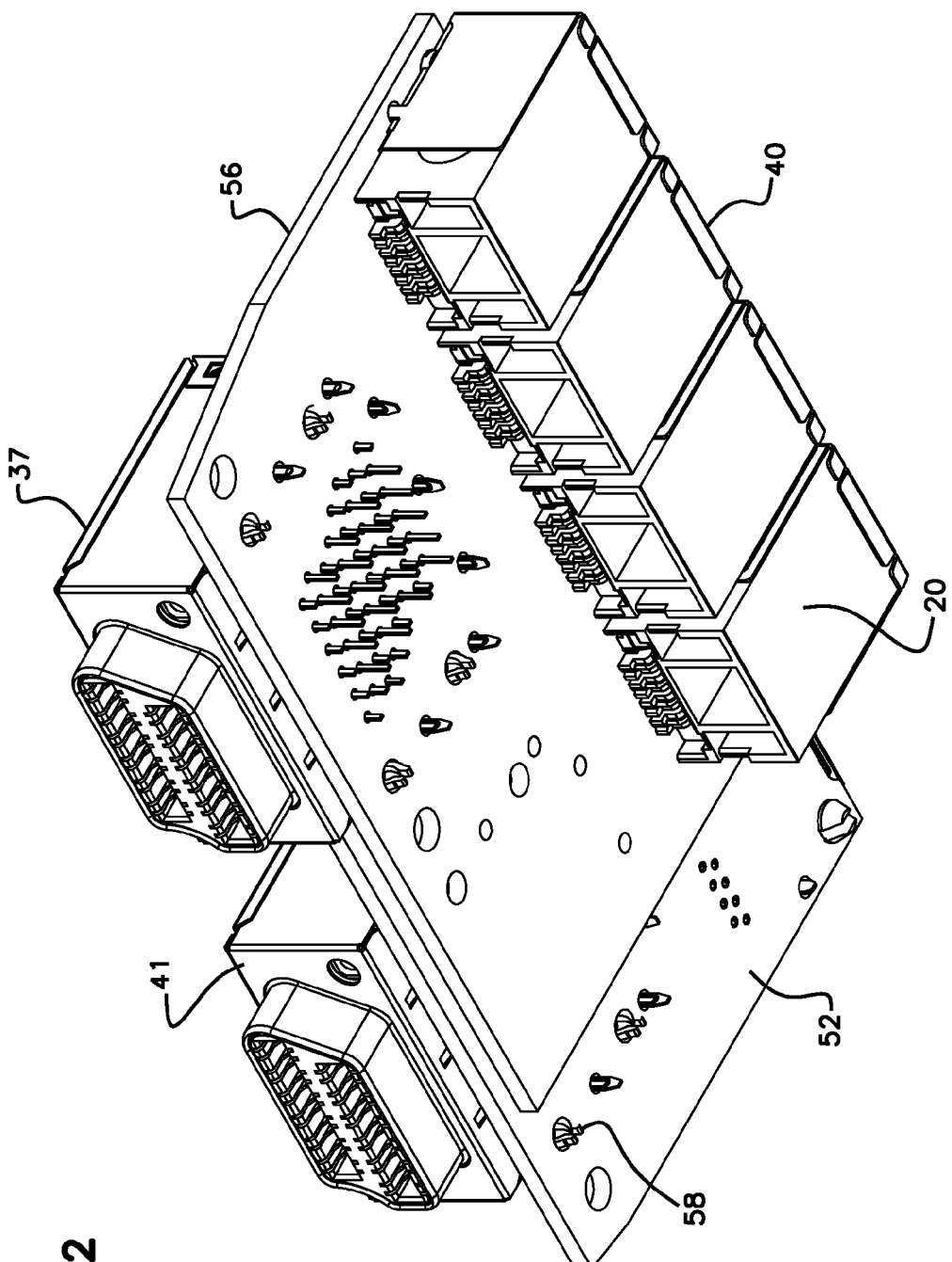
FIG. 22 is a bottom, rear perspective view of the components shown in FIG. 16.

Referring now to FIGS. 8 through 11, telecommunications cassette 14 is shown in greater detail. Cassette 14 includes a body 30, a front 32, and a rear 34. Jacks 20 are mounted on front 32. MRJ21 connectors 36 are mounted to rear 34. As shown, there are eight RJ45 jacks 20, mounted in two rows 38. The orientation of the jacks 20 is reversed between the two rows 38. Also, as shown the MRJ21 connectors 36 are oriented in the same direction but staggered slightly vertically. Note the non-symmetrical shape of the connectors 36 as shown in FIG. 11.

On rear 34 is a further connector 42 as part of the cable management and tracing functionality of cassette 14. As will be described below, circuitry contained within cassette 14 connects RJ45 jacks 20 to MRJ21 connectors 36. The connection between the additional contact 24 of plugs 18 and connector 42 is known technology for cable management and tracing.

Cassette 14 includes angled sides 35 which help to allow for the angled mounting as shown in FIGS. 1 and 2.

Cassette 14 has a height 62 less than 44.25 mm. Preferably, the height is less than 40.00 mm. More preferably, the height 62 is less than 37 mm. More preferably, the height is less than 35 mm. In one implementation, the height is 34.82 mm.

Referring now to FIGS. 12 through 15, an alternative telecommunications cassette 114 is shown. Cassette 114 has a similar construction to cassette 14. One difference is that cassette 114 lacks the cable management and tracing function. A front window 46 is provided for cassette management upgrade. A PCB 28 would be added to add the cable management and tracing features. Cassette 114 includes the front two rows of RJ45 jacks 20 and the two rear MRJ21 connectors 36, slightly offset from each other as in cassette 14.

As can be seen in FIGS. 8 through 15, the two rows 38 of RJ45 jacks 20 are reversed relative to each other in jack orientation. Also, the rows 38 are offset from one another. Referring now to FIGS. 16 through 22, the cassettes 14, 114 with the RJ45 jacks 20 and the MRJ21 connectors 36 are shown including the internal connectivity structure linking the various jacks and connectors. As shown, two printed circuit boards (PCBs) 50 are located within the interior of body 30. A first PCB is labeled 52, and a second PCB is labeled 56. A first row 39 of RJ45 jacks 20 is connected to first PCB 52 and a second row 40 of RJ45 jacks 20 is connected to second PCB 56. Each jack 20 is snap-fit to each respective PCB 52, 56 with resilient snaps 58 which project through openings 60 in PCB 52, 56. Jacks 20 are also electrically connected to the respective PCB 52, 56, such as through soldering. By offsetting the rows 39, 40 of jacks 20, the snaps 58 do not interfere with each other. Such a feature helps reduce the height dimension 62 of body 30 of cassettes 14, 114. Through circuit tracings 70 on PCBs 52, 56 MRJ21 connectors 36 are connected to RJ45 jacks 20.

Also, orienting one of the MRJ21 connectors 41 on the same side of the circuit board 50 as jacks 20 allows for a reduction in height 62 of body 30. A further notch 66 allows for MRJ21 connector 37 to be mounted on the opposite side of second PCB56 without interfering with first PCB52. Each connector 36 is snap-fit to each respective PCB 52, 56 with resilient snaps 58 which project through openings 60 in PCB 52, 56. Connectors 36 are also electrically connected to the respective PCB 52, 56, such as through soldering. MRJ21 connectors 36 and the mating connectors which mate with connectors 36 are shown for example in U.S. Pat. Nos. 6,582,255; 7,901,236; and 7,901,238, the disclosures of which are hereby incorporated by reference. Even though each MRJ21 connector 36 is capable of handling 24 pairs of connections, only 16 pairs of connections are utilized as shown and described in U.S. Patent Application Ser. No. 61/579,578, filed Dec. 22, 2011, the disclosure of which is incorporated by reference.

Therefore, with the constructions described above and shown in the drawings, a reduced profile is provided with cassettes 14, 114 due to the arrangement of the internal parts connecting the RJ45 jacks 20 to the MRJ21 connectors 36. Such a construction of the interior circuitry also does not cause excessive increases in a depth 64 of cassettes 14, 114.

Figure 23:
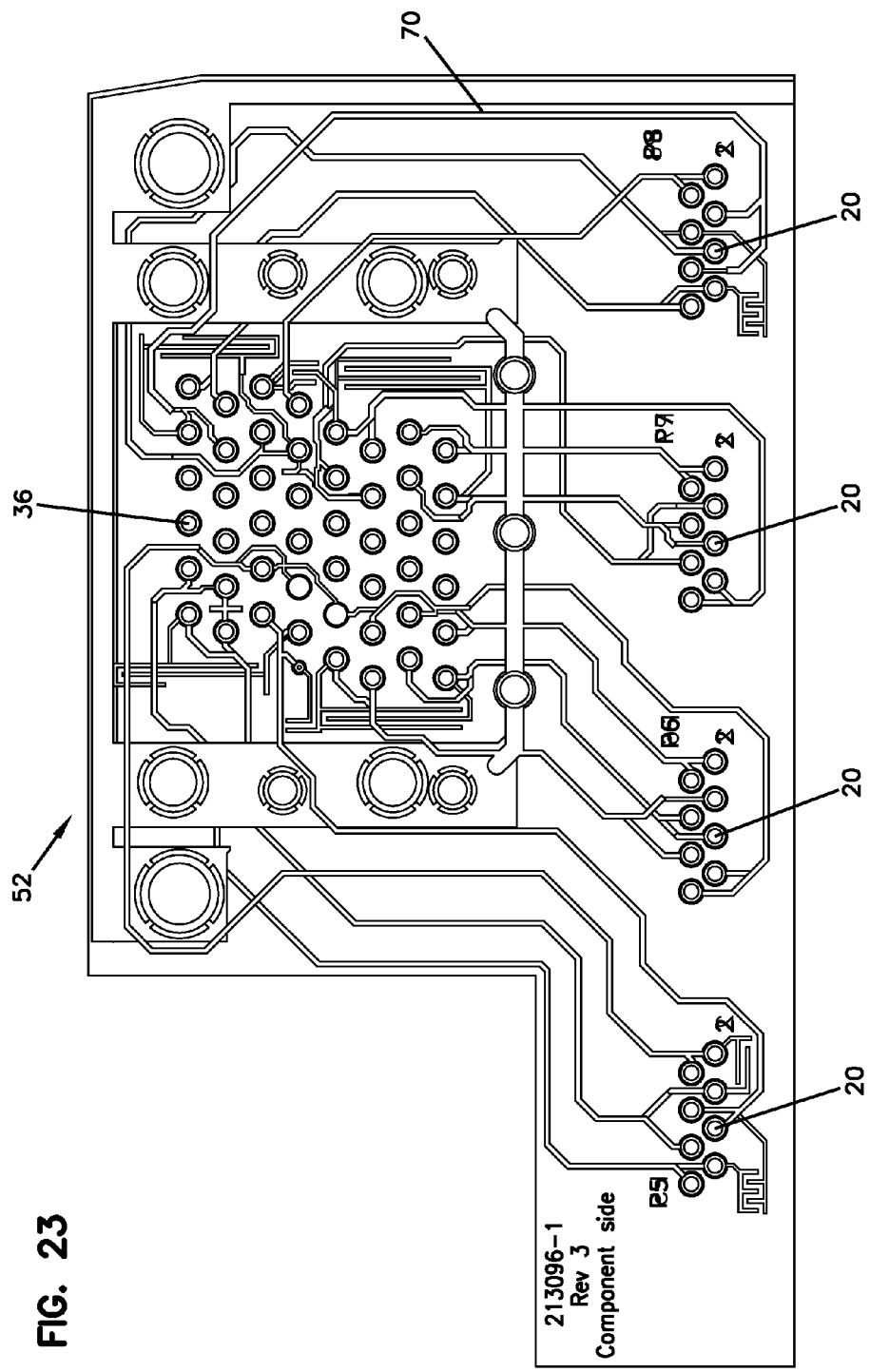
FIG. 23 is one implementation of one of the printed circuit boards of the cassette.
Figure 24:
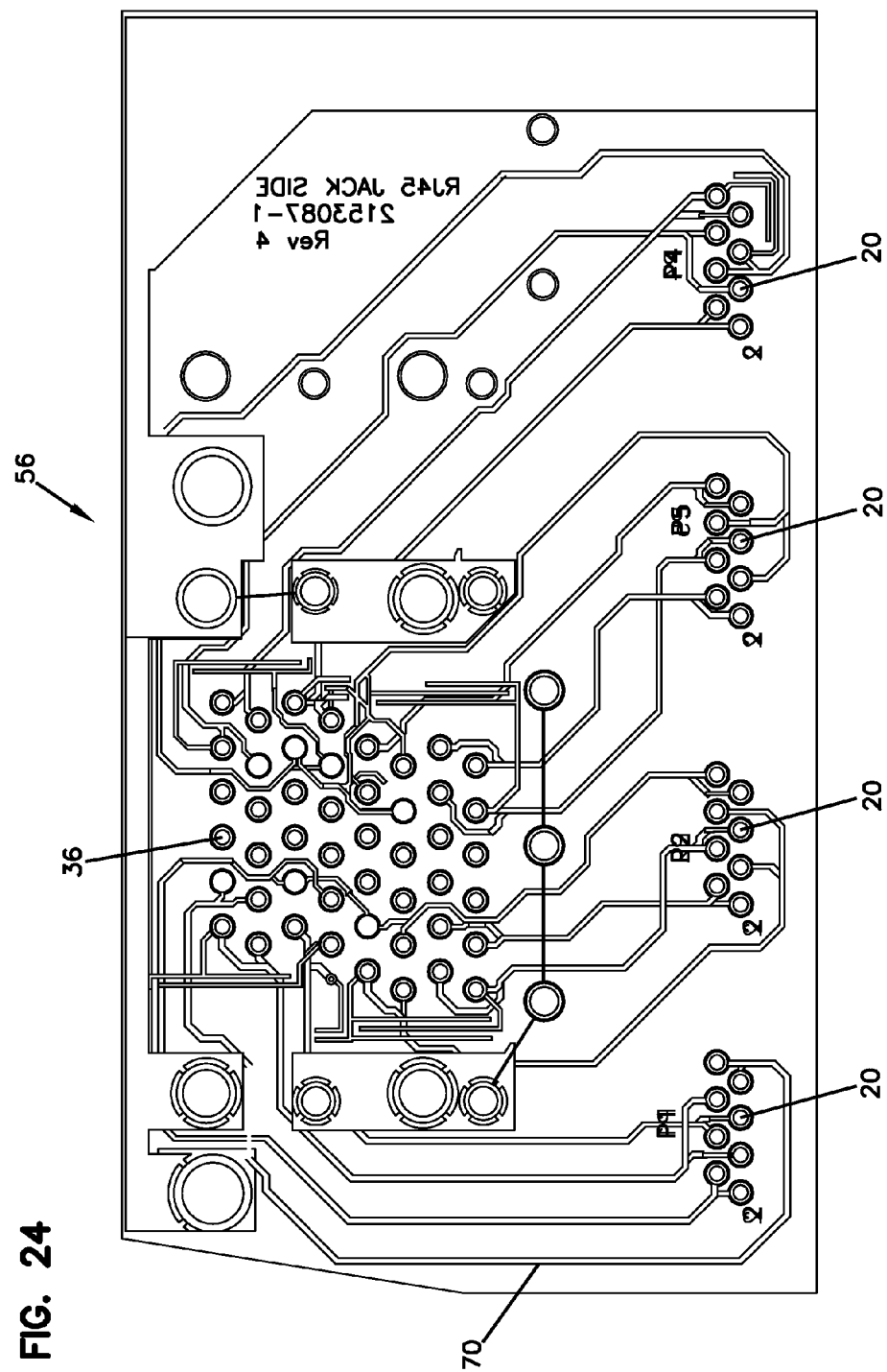
FIG. 24 is one implementation of another one of the printed circuit boards of the cassette.

In the illustrated embodiments, cassettes 14, 114 achieve 10 GbE electrical performance. See the tracings 70 on the PCBs 52, 56 of FIGS. 23 and 24.

Cassettes 14, 114 link four-pair cables 19 with plugs 18 at front jacks 20 to multi-air cables (e.g. 24-pair) connected with connectors to MRJ21 connectors 36. One preferred usage is in patch panel 10. One preferred circuit arrangement is eight-port cassettes with two multi-pair rear connectors.

10 patch panel
14 cassette
16 rear cable manager
18 plugs
19 copper cables
20 jacks
22 main contacts
24 additional contact
26 conductive pad
28 pcb
30 body
35 angled sides
36 connector
38 two rows
39 first row
40 second row
42 connector
46 front window
50 circuit boards
52 first pcb
56 second pcb
58 resilient snaps
60 openings
62 height
64 depth
66 notch
70 tracings
114 alternative telecommunications cassette

The invention claimed is:

1. A telecommunications cassette (14, 114) comprising:
a body (30) having depth (64) defined between a front (32) and an opposite rear (34), a height (62) defined between a first surface and a second surface, and a width defined perpendicularly with respect to the height and the depth;
two rows (39, 40) of RJ45 jacks (20) disposed on the front (32), wherein the two rows of RJ45 jacks comprise a first row and a second row extending in parallel to the width of the body (30);
two MRJ21 connectors (36) disposed on the rear (34), wherein the two MRJ21 connectors comprise a first MRJ21 connector and a second MRJ21 connector;
wherein the two rows (39, 40) of RJ45 jacks (20) are oriented opposite to one another in parallel to the width of the body (30);
wherein the two rows (39, 40) of RJ45 jacks (20) are offset from one another along the width of the body (30);
wherein the MRJ21 connectors (36) are oriented pursuant to a common direction, and have a common orientation with reference to the height (62) and width of the body (30);
wherein the MRJ21 connectors (36) are offset from one another along the height (62) of the body (30);
wherein two circuit boards (52, 56) are provided in parallel and offset along the width within the body (30), wherein the two circuit boards comprise a first circuit board and a second circuit board, wherein the two circuit boards comprise a first surface with orientation corresponding to the first surface of the body (30) and a second surface with orientation corresponding to the second surface of the body (30), wherein the first row of RJ45 jacks and the first MRJ21 connector are mounted to the first circuit board first surface, wherein the second row of RJ45 jacks is mounted to the second circuit board second surface and the second MRJ21 connector is mounted to the second circuit board first surface; wherein one row (39, 40) of RJ45 jacks (20) is connected to a respective one of the MRJ21 connectors (36).

2. The telecommunications cassette of claim 1, wherein there are four RJ45 jacks (20) in each row (39, 40).

3. The telecommunications cassette of claim 1, wherein one of the circuit boards (52, 56) includes a notch for receiving one of the MRJ21 connectors (36).

4. The telecommunications cassette of claim 1, wherein four cassettes (14, 114) are mounted in a row in a patch panel (10).

5. The telecommunications cassette of claim 4, wherein the four cassettes (14, 114) are mounted in an angled row in the patch panel (10).

6. The telecommunications cassette of claim 1, wherein the first and second MRJ21 connectors are oriented in the same direction.

7. The telecommunications cassette of claim 1, wherein the first and second rows of RJ45 jacks are oriented along different directions from one another.

8. A telecommunications connector system comprising:
a first assembly comprising a first circuit board with an first surface and a second surface, a first row of RJ45 jacks and a first MRJ21 connector, wherein the first assembly comprises a height, a depth and a width along which the first row of RJ45 jacks extend;
a second assembly comprising a second circuit board with a first surface and a second surface, a second row of RJ45 jacks and a second MRJ21 connector, wherein the second assembly comprises a height, a depth and a width along which the second row of RJ45 jacks extend, wherein the first circuit board and the second circuit board are arranged in parallel and offset with respect to each other, wherein the first row of RJ45 jacks and the second row of RJ45 jacks are offset from each other in parallel to the width;
wherein the first circuit board first surface and the second circuit board first surface are oriented in a common direction, and the first circuit board second surface and the second circuit board second surface are oriented in a common direction; and
wherein the first row of RJ45 jacks is oriented in reverse with respect to the second row of RJ45 jacks, wherein the first row of RJ45 jacks are mounted to the first circuit board first surface and the second row of RJ45 jacks are mounted to the second circuit board second surface;
wherein the first MRJ21 connector and the second MRJ21 connector have a common orientation and are secured to the common first or second surfaces of the first and second circuit boards respectively.

9. The telecommunications connector system of claim 8, further comprising a housing, wherein the first assembly and the second assembly are positioned in the housing.

* * * * *